United States Patent
Manoharan et al.

(10) Patent No.: US 11,386,455 B2
(45) Date of Patent: Jul. 12, 2022

(54) METHODS AND APPARATUS FOR PROVIDING A UNIFIED SERVING PLATFORM ACROSS MULTIPLE TENANTS AND TOUCHPOINTS

(71) Applicant: Walmart Apollo, LLC, Bentonville, AR (US)

(72) Inventors: Shirpaa Manoharan, Sunnyvale, CA (US); Kannan Achan, Saratoga, CA (US); Evren Korpeoglu, San Jose, CA (US); Sushant Kumar, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/736,748

(22) Filed: Jan. 7, 2020

(65) Prior Publication Data
US 2021/0209643 A1 Jul. 8, 2021

(51) Int. Cl.
| | |
|---|---|
| *G06Q 30/00* | (2012.01) |
| *G06Q 30/02* | (2012.01) |
| *G05B 19/418* | (2006.01) |
| *G06N 20/00* | (2019.01) |

(52) U.S. Cl.
CPC ..... *G06Q 30/0255* (2013.01); *G06Q 30/0204* (2013.01); *G06Q 30/0254* (2013.01); *G06Q 30/0269* (2013.01); *G06N 20/00* (2019.01)

(58) Field of Classification Search
CPC ........... G06Q 30/0255; G06Q 30/0204; G06Q 30/0254; G06Q 30/0269; G06N 20/00
See application file for complete search history.

(56) References Cited

U.S. PATENT DOCUMENTS

| | | |
|---|---|---|
| 7,584,208 B2 | 9/2009 | Spivack et al. |
| 7,881,984 B2 | 2/2011 | Kane, Jr. et al. |
| 7,945,485 B2 | 5/2011 | Kane, Jr. et al. |

(Continued)

OTHER PUBLICATIONS

Approaches to Machine Learning. 1984. Carnegie-Mellon University. (Year: 1984).*

(Continued)

*Primary Examiner* — Maria V Vanderhorst
(74) *Attorney, Agent, or Firm* — Duane Morris LLP; Manita Rawat

(57) ABSTRACT

This application relates to apparatus and methods for providing a unified serving platform that allows for the reusability of machine learning models across a plurality of websites to determine personalized content. For example, a computing device trains a machine learning model with session data identifying browsing events and transaction data identifying purchasing events for a plurality of users. The computing device receives and stores session data and transaction data associated with a first website for the customer. The computing device may then receive a request for content to display to the customer on a second website. The computing device generates label data based on the session data and transaction data associated with the first website, and executes the trained machine learning model with the label data. Based on execution of the trained machine learning model, the computing device generates content to display on the second website, and transmits the content.

16 Claims, 8 Drawing Sheets

(56) References Cited

U.S. PATENT DOCUMENTS

| | | | |
|---|---|---|---|
| 7,974,888 B2 | 7/2011 | Kane, Jr. et al. | |
| 8,161,066 B2 | 4/2012 | Spivack et al. | |
| 8,190,684 B2 | 5/2012 | Spivack et al. | |
| 8,275,674 B2 | 9/2012 | Kane, Jr. et al. | |
| 8,504,441 B2 | 8/2013 | Kane, Jr. et al. | |
| 8,965,979 B2 | 2/2015 | Spivack et al. | |
| 8,977,614 B2 | 3/2015 | Skillen et al. | |
| 9,009,150 B2 | 4/2015 | Skillen et al. | |
| 9,110,991 B2 | 8/2015 | Skillen et al. | |
| 9,129,019 B2 | 9/2015 | Skillen et al. | |
| 9,378,516 B2 | 6/2016 | Aldrey et al. | |
| 10,372,791 B2 | 8/2019 | Thomas et al. | |
| 10,402,856 B2 | 9/2019 | Dhawan et al. | |
| 10,643,266 B2 * | 5/2020 | Isaacson | G07G 1/01 |
| 10,686,834 B1 * | 6/2020 | Hitchcock | H04L 63/1466 |
| 2009/0192976 A1 | 7/2009 | Spivack et al. | |
| 2011/0313846 A1 | 12/2011 | Patwa et al. | |
| 2012/0158461 A1 | 6/2012 | Aldrey et al. | |
| 2015/0286645 A1 * | 10/2015 | Sinha | G06F 16/9535 |
| | | | 707/734 |
| 2015/0304400 A1 | 10/2015 | Spivack et al. | |
| 2017/0109647 A1 * | 4/2017 | Chow | G06N 20/00 |
| 2019/0213283 A1 | 7/2019 | Benkreira et al. | |
| 2021/0133851 A1 * | 5/2021 | Chen | G06K 9/6263 |

OTHER PUBLICATIONS

"A survey paper on techniques and applications of web usage mining". IEEE. 2017. (Year: 2017).*

\* cited by examiner

METHODS AND APPARATUS FOR PROVIDING A UNIFIED SERVING PLATFORM ACROSS MULTIPLE TENANTS AND TOUCHPOINTS

TECHNICAL FIELD

The disclosure relates generally to providing online content and, more specifically, to electronically determining and providing content to online marketplaces.

BACKGROUND

At least some online marketplaces, such as retailer websites, display content. The content may include, for example, item advertisements. The item advertisements may include an image of an item, and a price of the item. For example, a website may display item advertisements, and may further allow a customer to purchase the advertised items. At least some online marketplaces display content directed to individual customers. For example, an online marketplace may display a first set of item advertisements to a first customer browsing the online marketplace, and display a second set of item advertisements to a second customer browsing the online marketplace. In some examples, a retailer may operate multiple online marketplaces. Each online marketplace may allow for the purchase of various categories of items. A customer may visit each online marketplace, and may purchase items through each marketplace. There are opportunities to address the determination and providing of content to users across various online marketplaces.

SUMMARY

The embodiments described herein are directed to automatically determining and providing online content to customers (e.g., users) across multiple tenants (e.g., online marketplaces) and touchpoints (e.g., points of interaction). The embodiments provide a single unified interface that can serve multiple touchpoints between a customer and a retailer. For example, the embodiments may allow for standardized data across the multiple tenants and touchpoints, as well as the usability (and re-usability) of models, such as machine learning models and content selection algorithms, across various tenants and touchpoints. As such, the embodiments can provide a personalized experience to each of a plurality of customers when they visit each of the multiple tenants, regardless of whether each customer has a previous experience with a particular tenant. For example, the embodiments may allow for the personalized display of content, such as item advertisements, to a customer browsing one online marketplace (e.g., website) based on browsing session data and/or transaction data associated with the customer on another online marketplace.

As a result, the embodiments may allow a customer to be presented with advertisements that may be more relevant to (e.g., likely to interest) the customer across tenants. For example, the embodiments may allow the person to view advertisements for items that the person may be more interested in purchasing. The embodiments may also address cold start issues related to content recommendations when a customer has no previous history with one tenant. As such, the embodiments may allow for an improved user experience with purchasing items on an online marketplace. Moreover, the embodiments may allow a retailer to increase item advertisement conversions (e.g., an amount of advertised items sold). In addition to or instead of these example advantages, persons of ordinary skill in the art having the benefit of these disclosures may recognize and appreciate other advantages as well.

In accordance with various embodiments, exemplary systems may be implemented in any suitable hardware or hardware and software, such as in any suitable computing device. For example, in some embodiments, a computing device trains a machine learning model with session data identifying browsing events and transaction data identifying purchasing events for a plurality of users. The computing device also receives and stores session data and transaction data associated with a first website for the customer. The computing device may then receive a request for content to display to the customer on a second website. The computing device generates label data based on the session data and transaction data associated with the first website, and executes the trained machine learning model with the label data. Based on execution of the trained machine learning model, the computing device generates content to display on the second website, and transmits the content.

In some embodiments, a computing device is configured to obtain session data identifying browsing events of a plurality of users for a first marketplace. The computing device may also be configured to obtain transaction data identifying purchase transactions of at least a portion of the plurality of users for the first online marketplace. The computing device may be configured to generate user profile data for each of the plurality of users based on the session data and the purchase transactions. The computing device may further be configured to receive a content request for content to display to a first user on a second marketplace. The content request may be received from a web server, for example. The computing device may be configured to determine content to display to the first user based on the generated user profile data for the plurality of users. In some examples, the computing device applies a trained machine learning model to at least a portion of the generated user profile data to determine the content. The computing device may also be configured to transmit the content for display, such as to the web server.

In some embodiments, a method is provided that includes obtaining session data identifying browsing events of a plurality of users for a first marketplace. The method may also include obtaining transaction data identifying purchase transactions of at least a portion of the plurality of users for the first online marketplace. Further, the method may include generating user profile data for each of the plurality of users based on the session data and the purchase transactions. The method may also include receiving a content request for content to display to a first user on a second marketplace. Further, the method may include determining content to display to the first user based on the generated user profile data for the plurality of users. In some examples, the method includes applying a trained machine learning model to at least a portion of the generated user profile data to determine the content. The method may also include transmitting the content for display.

In yet other embodiments, a non-transitory computer readable medium has instructions stored thereon, where the instructions, when executed by at least one processor, cause a computing device to perform operations that include obtaining session data identifying browsing events of a plurality of users for a first marketplace. The operations may also include obtaining transaction data identifying purchase transactions of at least a portion of the plurality of users for the first online marketplace. Further, the operations may include generating user profile data for each of the plurality of users based on the session data and the purchase transactions. The operations may also include receiving a content request for content to display to a first user on a second marketplace. Further, the operations may include determining content to display to the first user based on the generated user profile data for the plurality of users. In some examples, the operations include applying a trained machine learning model to at least a portion of the generated user profile data to determine the content. The operations may also include transmitting the content for display.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
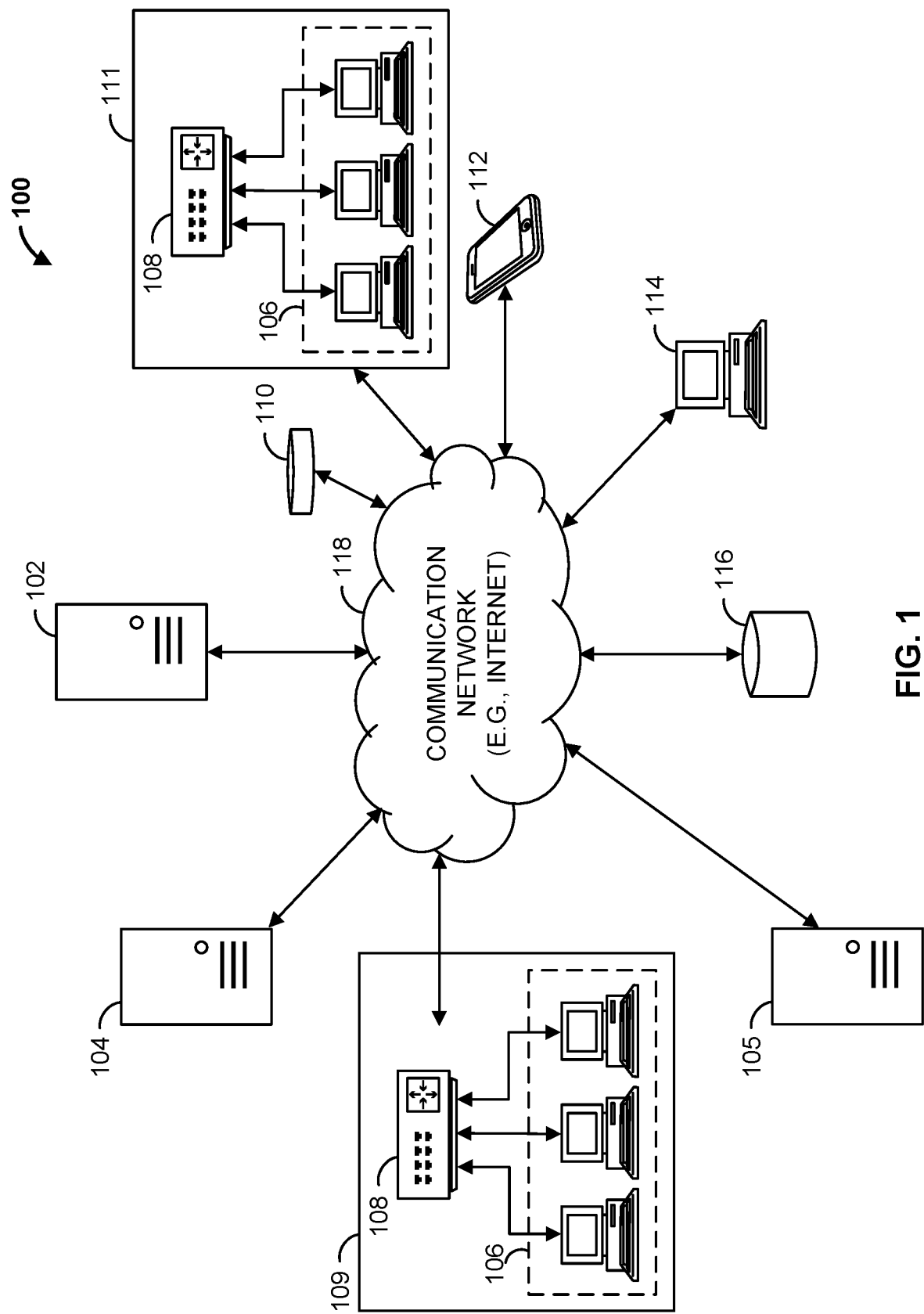
FIG. 1 is a block diagram of an unified platform content recommendation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments described can employ machine learning processes across a variety of tenants and touchpoints to determine content that can be displayed to a particular customer. For example, the same machine learning process may be employed to generate content for a first online marketplace, and to generate content for a second online marketplace. In some examples, a machine learning process can be tested on a first tenant, and be deployed to a second tenant.

The machine learning processes may operate on customer data corresponding to the particular customer. Customer data can include, for example, browsing session data associated related to the customer browsing an online marketplace (e.g., retailer's website). Browsing session data can include, as an example, user queries (e.g., searches) performed by the customer, an IP address (e.g., an IP address of a device the customer is using to access the online marketplace), and context of a webpage being viewed by the customer. The context of an item webpage (e.g., a webpage dedicated to an item) may be the item, while the context of a category webpage (e.g., a webpage dedicated to a category of items) may be the category of the items being viewed. In some examples, if the user is on a cart webpage (e.g., an online cart webpage showing items added to an online shopping cart), the context of the webpage may be the items in the cart.

Customer data may also include online transaction data related to purchase transactions the customer has placed on the online marketplace. For example, online transaction data can include a purchase date, a user identification (ID), an ID of each item purchased, a price of each item, an IP address of a device used to access the online marketplace, and a total price for the transaction. In some examples, the customer data can also include store transaction data related to purchase transactions the customer has placed in a store (e.g., a retailer's store). Store transaction data can include, for example, a purchase date, a user identification (ID), a store ID of where the store where the purchase was made, an ID of each item purchased, a price of each item, and a total price for the transaction.

In some examples, the machine learning processes are employed to determine content including item advertisement recommendations (e.g., one or more items to advertise to the customer). In some examples, the machine learning processes are employed to determine creative content recommendations to be displayed to the customer. Creative content recommendations can include, for example, advertisements for a brand, advertisements for a category of items, an advertising banner, or any other website content. In some examples, creative content can include a representation of a sale event on a website, such as a sales event on a holiday or special day (e.g., Mother's day). The creative content may include creatives irrespective of dimensions.

The item advertisements and create content may be displayed to the customer while browsing an online marketplace. In some examples, the item advertisements and/or creative content is transmitted to a mobile device of the customer, and may be displayed on the mobile device (e.g., on a mobile application executing on the mobile device). In some examples, the machine learning processes are employed to generate one or more communications to a mobile device of one or more particular customers. For example, the communication may be an email, a short message service (SMS) message (e.g., text), or a mobile app push notification.

Turning to the drawings, FIG. 1 illustrates a block diagram of an unified platform content recommendation system 100 that includes an unified platform computing device 102 (e.g., a server, such as an application server), a first web server 104, a second web server 105, workstations 106, database 116, and multiple customer computing devices 110, 112, 114 operatively coupled over network 118. Unified platform computing device 102, workstations 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, unified platform computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, unified platform computing device 102 is operated by a retailer, and multiple customer computing devices 112, 114 are operated by customers of the retailer.

Workstations 106 are operably coupled to communication network 118 via router (or switch) 108. Workstations 106 and/or router 108 may be located at one of a store 109 or store 111, for example. Workstations 106 can communicate with unified platform computing device 102 over communication network 118. The workstations 106 may send data to, and receive data from, unified platform computing device 102. For example, the workstations 106 may transmit data related to an order purchased by a customer at store 109 (or store 111) to unified platform computing device 102. In response, unified platform computing device 102 may determine and transmit content, such as item advertisements, to provide to the purchasing customer. For example, the item advertisements may be displayed on a receipt handed to the customer for the purchase order.

Although FIG. 1 illustrates three customer computing devices 110, 112, 114, unified platform content recommendation system 100 can include any number of customer computing devices 110, 112, 114. Similarly, unified platform content recommendation system 100 can include any number of web servers 104, 105, stores 109, 111, workstations 106, item recommendation computing devices 102, and databases 116.

In some examples, each of web server 104 and web server 105 may host a website for an online marketplace, such as a retailer's online marketplace. The website may allow a customer to view and purchase items. The website may also display advertisements for items that a customer may purchase on the website. In some examples, unified platform computing device 102 transmits content to web server 104 and web server 105 to display to a particular customer on the respective websites. For example, unified platform computing device 102 may transmit one or more item advertisements and/or creative content to display to the particular customer while the customer is browsing a respective website. The item advertisements may be displayed on a checkout webpage, on a homepage, on an item webpage, a category webpage (e.g., webpage dedicated to a category of the advertised item), or any other suitable webpage. As such, unified platform computing device 102 may allow for a personalized experience across online marketplaces provided by web server 104 and web server 105.

In some examples, web server 104 and/or web server 105 transmit user transaction data for one or more customers to unified platform computing device 102. User transaction data may identify, for example, purchase transactions (e.g., the purchase of items) made by the customers on a website.

In some examples, web server 104 and/or web server 105 transmit user session data to unified platform computing device 102. User session data may identify items viewed, engaged (e.g., clicked on), or purchased on a website. User session data may also identify, for example, item advertisement impressions, items added to an online shopping cart, or items purchased after an engagement on the website of an advertisement for the items. User session data may also identify user queries (e.g., searches run by a user on the website), or any other data related to the browsing of a website.

First customer computing device 110, second customer computing device 112, and $N^{th}$ customer computing device 114 may communicate with web server 104 and/or web server 105 over communication network 118. For example, each of multiple computing devices 110, 112, 114 may be operable to view, access, and interact with webpages of a website hosted by web server 104 and/or web server 105. In some examples, web server 104 and/or web server 105 each host a website for an online marketplace of a retailer that allows for the purchase of items. A customer operating of one of multiple computing devices 110, 112, 114 may access the website hosted by each of web server 104 and web server 105, add one or more items to an online shopping cart of each respective website, and perform an online checkout of the shopping cart to purchase the items.

Unified platform computing device 102 is operable to communicate with database 116 over communication network 118. For example, unified platform computing device 102 can store data to, and read data from, database 116. Database 116 can be a remote storage device, such as a cloud-based server, a memory device on another application server, a networked computer, or any other suitable remote storage. Although shown remote to unified platform computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, unified platform computing device 102 trains a machine learning mode (e.g., algorithm), such as one based on recurrent neural networks (RNN), with user session data for a plurality of customers associated with a first online marketplace, such as an online marketplace hosted by web server 104. The user session data may be based on historical browsing sessions of the first online marketplace (e.g., historical session data). For example, user session data can identify a user identification (ID) for each customer, one or more search queries performed by each customer, and items engaged during each user session, such as items viewed, items added to an online cart, and/or items purchased by the customer. In some examples, the machine learning model is also trained with online user transaction data (e.g., associated with the first online marketplace) and/or store transaction data (e.g., store transaction data from store 109 and/or store 111). The online user transaction data and/or store transaction data may be based on previous transactions (e.g., historical online transaction data and historical store transaction data, respectively). The trained machine learning model may be employed to determine content, such as item advertisements and/or creative content, to be displayed to a customer when that customer is browsing a second online marketplace, such as an online marketplace hosted by web server 105.

In some examples, unified platform computing device 102 employs the trained machine learning model to determine content, such as item recommendations, for each of a plurality of customers across tenants. For example, unified platform computing device 102 may generate a user profile for a customer based on user session data, online transaction data, and/or store transaction data related to a first online marketplace hosted by web server 104. When the customer browses a second online marketplace hosted by web server 105, for example, web server 105 may send a request to unified platform computing device 102 for content to display to the customer. Unified platform computing device 102 may execute the trained machine learning model based on the user profile data for the customer to determine the content, such as item recommendations, and transmit the content to web server 104. As such, although there may be no user session data or online transaction data related to the second online marketplace for the customer, unified platform computing device 102 can nonetheless determine content for the customer when the customer browses the second online marketplace.

In some examples, unified platform computing device 102 provides the trained machine learning model with real-time events to determine the content for the customer. For example, web server 105 may transmit user session data to unified platform computing device 102 indicating that the customer has added an item to an online shopping cart during a browsing session of the second online marketplace. In response, unified platform computing device 102 can filter out (e.g., not include) the item from any item recommendations made for the customer. As another example, web server 105 may transmit user session data to unified platform computing device 102 indicating that the customer has performed a search (e.g., user search query). Unified platform computing device 102 can execute the trained machine learning model with the search to generate related item recommendations. Similarly, unified platform computing device 102 may user real-time events related to one tenant to generate recommendations for another tenant.

In some examples, unified platform computing device 102 determines an efficacy of the trained machine learning model by employing the trained machine learning model to determine content, such as item recommendations, for each of a subset of customers. Based on an evaluation of the efficacy of the item recommendations (e.g., based on item advertisement conversion rates and/or purchase rates), unified platform computing device 102 may then employ the trained machine learning algorithm to determine content for all customers. For example, if item conversion rates are above a threshold, unified platform computing device 102 may then employ the trained machine learning algorithm to determine content for all customers.

In some examples, the trained machine learning model may be employed to generate communications, such as emails or SMS messages, with content for a particular customer. For example, unified platform computing device 102 may execute the trained machine learning algorithm with user session data and/or user transaction data associated with a first online marketplace for a user to determine item advertisements for the user. Unified platform computing device 102 may then transmit an email or SMS message to a device of the customer, such as one of multiple computing devices 110, 112, 114.

Figure 2:
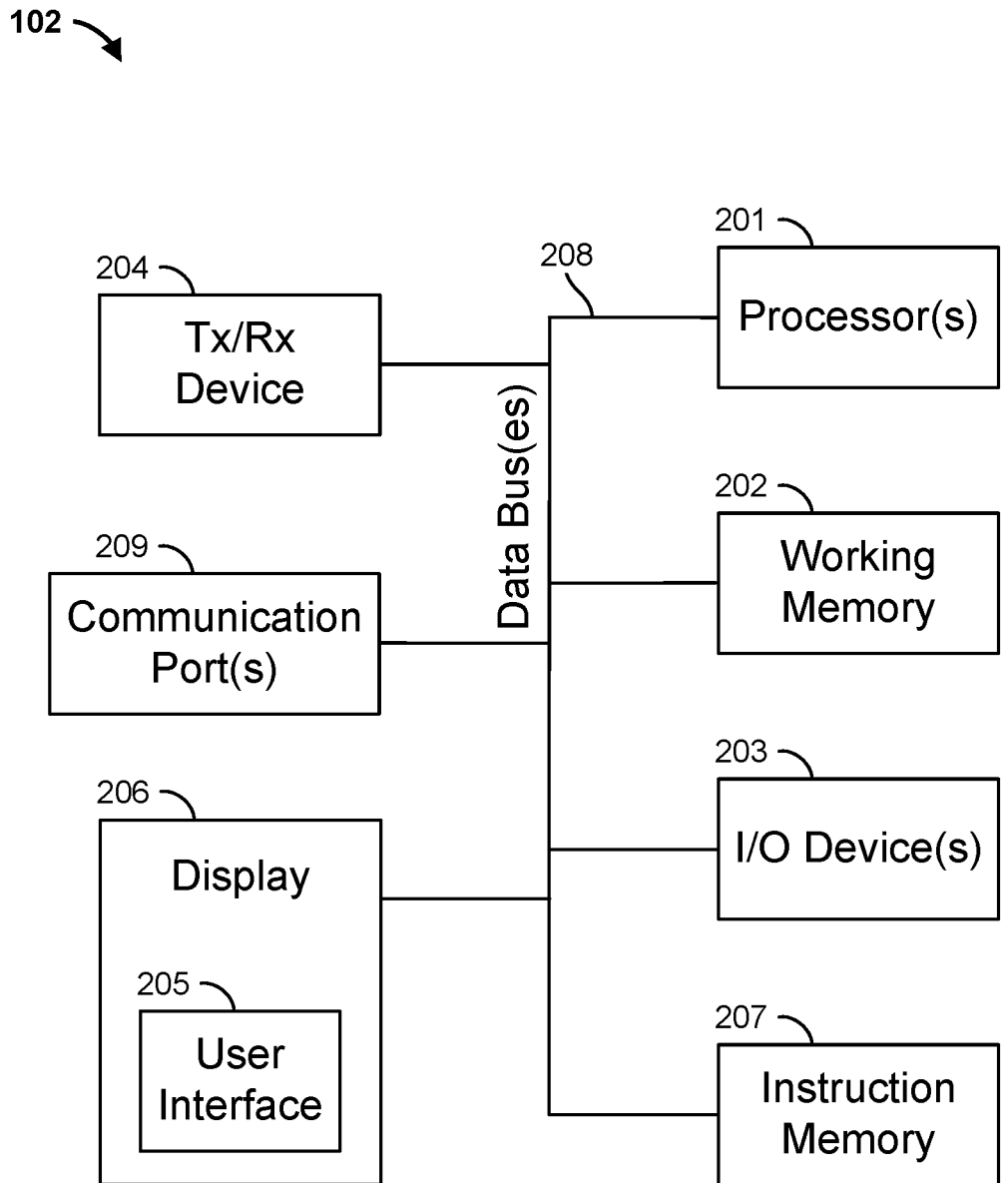
FIG. 2 is a block diagram of the unified platform computing device of the unified platform content recommendation system of FIG. 1 in accordance with some embodiments.

FIG. 2 illustrates the unified platform computing device 102 of FIG. 1. Unified platform computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of unified platform computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with unified platform computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 unified platform computing device 102 will be operating in. Processor(s) 201 is operable to receive data from, or send data to, a network, such as communication network 118 of FIG. 1, via transceiver 204.

Figure 3:
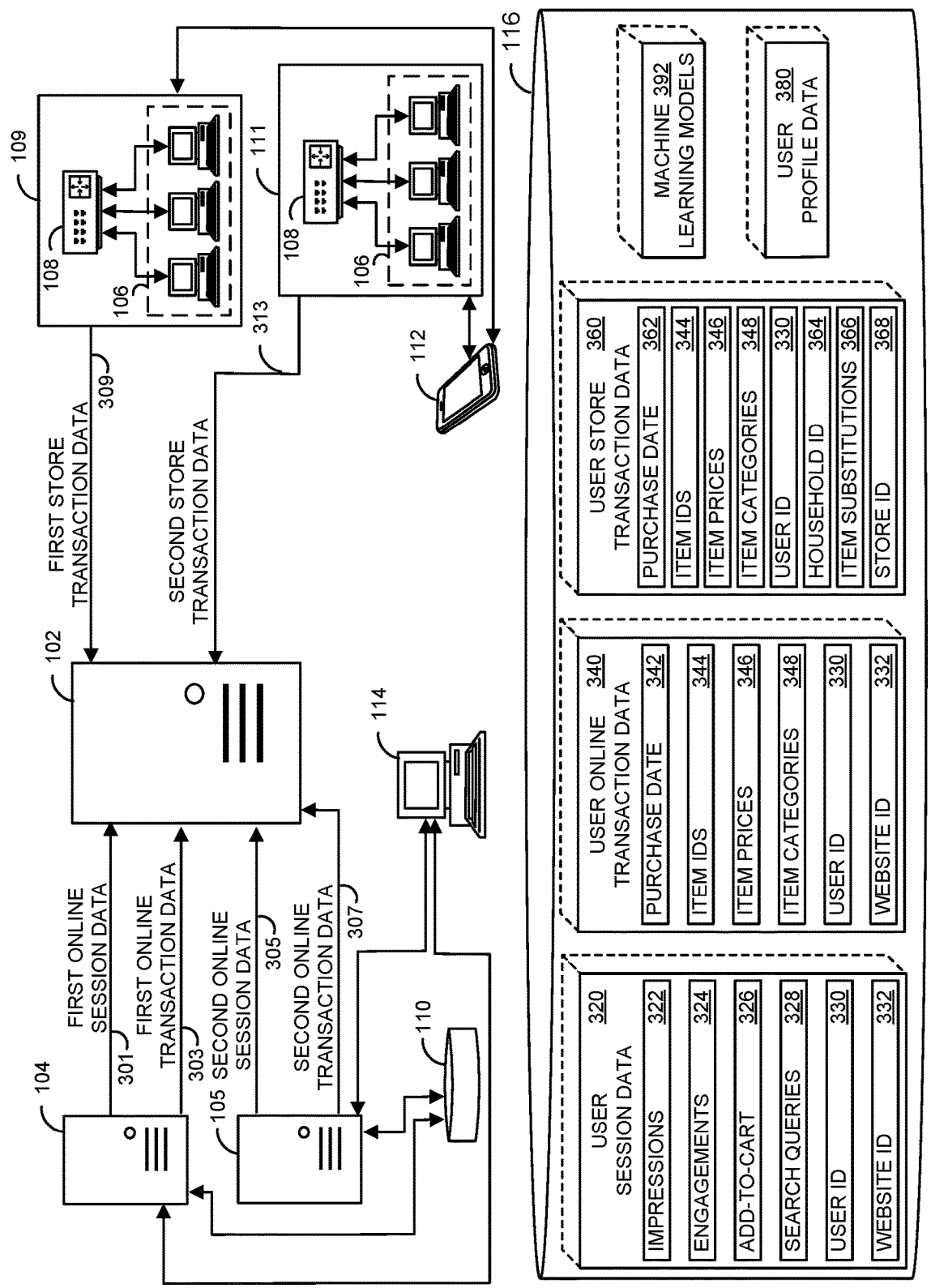
FIG. 3 is a block diagram illustrating examples of various portions of the unified platform content recommendation system of FIG. 1 in accordance with some embodiments.

FIG. 3 is a block diagram illustrating examples of various portions of the unified platform content recommendation system 100 of FIG. 1. In some examples, a customer, via one of multiple customer computing devices 110, 112, 114, may access a website hosted by web server 104. For example, customer computing device 110 may be a voice assistant device that accepts spoken commands from the customer. The customer may speak commands to have customer computing device 110 to access the website hosted by web server 104. Similarly, customer computing device 114 may be a computer. The customer may launch a web browser on customer computing device 114 to access the website. The website may present a first online marketplace. Web server 104 may capture events generated by the customer's activity on the website, and generate data identifying and characterizing those events. For example, web server 104 may generate first online session data 301, and first online transaction data 303.

First online session data 301 identifies data related to the browsing of a website by the customer. For example, first online session data 301 may identify impressions (e.g., items or item advertisements viewed), engagements (e.g., item advertisements clicked), items added add to cart (e.g., items added to online shopping carts), search queries, a user ID, an IP address of the customer computing device 110, 112, 114, and a website ID (e.g., IP address or URL of the website), and any other data related to the browsing of the website by the customer.

In some examples, the customer may also purchase items on the website hosted by web server 104. First online transaction data 303 identifies data related to purchasing activities by the customer. For example, first online transaction data 303 may identify a purchase date, item IDs of items purchased, item prices, item categories, a user ID for each purchase, an IP address of the customer computing device 110, 112, 114, and a website ID.

As indicated in the figure, web server 104 may transmit first online session data 301 to unified platform computing device 102. Unified platform computing device 102 may store user session data 301 for each customer in database 116. For example, unified platform computing device 102 may receive first online session data 301 for a customer browsing the website hosted by web server 104, determine the customer (e.g., based on a user ID), and store first online session data 301 for the customer in database 116 as user session data 320. For example, user session data 320 can include, for each customer, impressions 322, engagements 324, add-to-cart 328 (e.g., items added to the online shopping cart), search queries 328, user ID 330, and website ID 332.

Web server 104 may also transmit first online transaction data 303 to unified platform computing device 102. Unified platform computing device 102 may store user transaction data 303 for each customer in database 116. For example, unified platform computing device 102 may receive user transaction data 303 for the customer browsing the website hosted by web server 104, determine the customer (e.g., based on a user ID), and store user transaction data 303 for the customer in database 116 as user online transaction data 340. For example, user online transaction data 303 can include, for each customer, a purchase date 342, item IDs 344, item prices 346, item categories 348, user ID 330, and a website ID 332.

A customer may also visit store 109, and purchase items at store 109. In some examples, the customer places an order on the website hosted by web server 104, and selects an option to pick the items up at store 109. In other examples, the customer makes the purchase at store 109. For example, the customer may use an application executing on customer computing device 112 (e.g., a retailer's application) to make the payment at the store. For each purchase transaction, store 109 may transmit first store transaction data 309 to unified platform computing device 102. First store transaction data 309 may include, for example, a purchase date, item IDs, item prices, item categories, a user ID, a household ID (e.g., an address, a phone number, or any other household identifier), an indication of any item substitutions (e.g., a replacement item that replaced an original item because, for example, the original item was not available), and a store ID (e.g., an ID for the store the items are being purchased or picked up at).

Unified platform computing device 102 may store first store transaction data 309 received for each customer in database 116 as user store transaction data 360. For example, for each customer, user transaction data 360 can include a purchase date 362, item IDs 344, item prices 346, item categories 348, user ID 330, a household ID 364, item substitutions 366, and a store ID 368.

In some examples, unified platform computing device 102 receives online session data, online transaction data, and/or store transaction data from additional tenants for the customer. For example, web server 105 may host a website that presents a second online marketplace. The customer may browse the second online marketplace via one of customer computing devices 110, 114. Web server 105 may capture browsing events by the customer, generate second online session data 305 identifying the browsing events, and transmit second online session data 305 to unified platform computing device 102. Unified platform computing device 102 may store the second online session data 305, for each customer, in database 116 as user session data 320. As such, user session data 320 may identify, for each customer, browsing sessions by the customer at a plurality of websites.

Similarly, web server 105 may capture purchasing events for purchases made on the second online marketplace, and generate second online transaction data 307. Web server 105 may transmit second online transaction data 307 to unified platform computing device 102. Unified platform computing device 102 may store the second online transaction data 307, for each customer, in database 116 as user online transaction data 340. As such, user online transaction data 340 may identify, for each customer, online purchase transactions made by the customer at a plurality of websites.

The customer may also visit another store, such as store 111, and make purchases at store 111. In some examples, the customer makes the purchase on the second online marketplace, but selects an option to pick up the items at store 111. Store 111 may transmit second store transaction data 313 to unified platform computing device 102 for each purchase transaction. Unified platform computing device 102 may store second store transaction data 313 for each customer in database 116 as user store transaction data 360. As such, user store transaction data 360 may identify, for each customer, store transactions made by the customer at a plurality of stores.

In some examples, unified platform computing device 102 trains one or more machine learning models based on user session data 320, user online transaction data 340, and/or user store transaction data 360 aggregated for a plurality of users. The trained machine learning models may be stored in database 116 as identified by machine learning models 392.

In some examples, database 116 stores user profile data 380 which identifies and characterizes, for each of a plurality of customers, a user profile. User profile data 380 can identify, for each customer, one or more of a name, an address, a user ID 330, a phone number, an email address, and/or demographic data (e.g., gender, age, income level, occupation, marital status, etc.), which may be collected for each customer with each customer's affirmative consent. User profile data 380 may also include or "point to" user session data 320, user online transaction data 340, and user store transaction data 360 for each customer stored in database 116.

In some examples, unified platform computing device 102 may generate label data based on user profile data 380 for a customer, and provide the label data to a machine learning model identified by machine learning models 392 to determine content for the customer. For example, a customer may have browsed and purchased items on the first online marketplace hosted by web server 104, but may never have visited the second online marketplace hosted by web server 105. As such, user profile data 380 for the customer may be based on first online session data 301 and first online transaction data 303. In some examples, the user profile data 380 for the customer may also be based on first store transaction data 309 and/or second store transaction data 313. Assuming the customer now goes to browse the second online marketplace, unified platform computing device 102 may generate label data based on the user profile data 380 for the customer, and determine content, such as item recommendations or creative content, to be displayed to the customer when browsing the second online marketplace.

In some examples, unified platform computing device 102 may employ the trained machine learning model to determine content to be included in a communication to the customer. For example, unified platform computing device 102 may execute the trained machine learning model to generate item recommendations for the customer. Unified platform computing device 102 may then (e.g., upon request) send an email or text message to a customer computing device 110, 112, 114 of the customer that includes advertisements for the recommended items (e.g., an image and price of each item, and a link to the corresponding online marketplace to purchase each item).

Figure 4A:
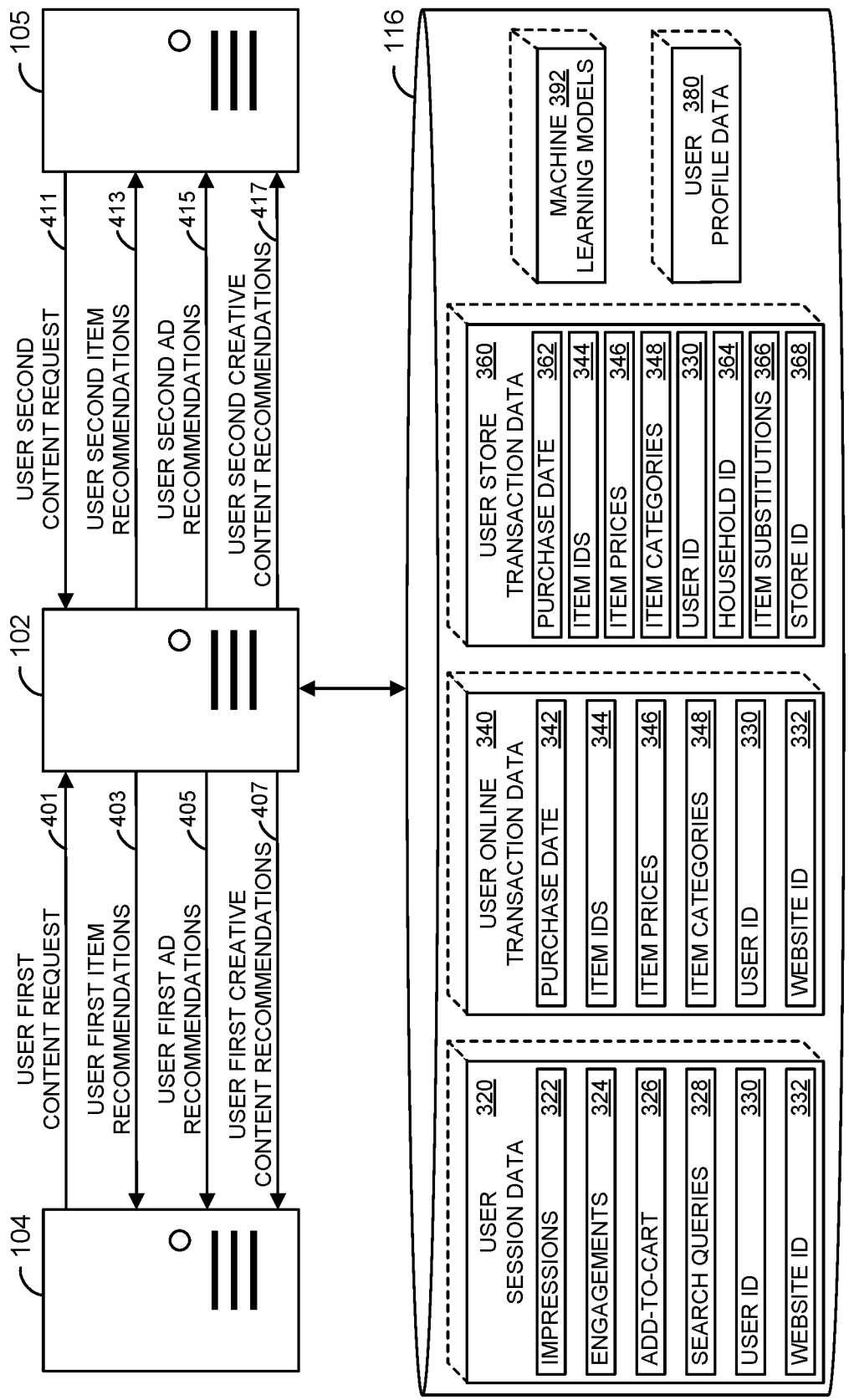
FIGS. 4A and 4B are block diagrams illustrating examples of various portions the unified platform computing device of FIG. 1 in accordance with some embodiments.

FIG. 4A illustrates an example of a request for content to display to a customer. In this example, web server 104 hosts a website that presents a first online marketplace to customers. When a customer visits the first online marketplace (e.g., via a customer computing device 110, 112, 114), web server 104 may transmit to unified platform computing device 102 a user first content request 401. User first content request 401 may identify, for example, the customer (e.g., via a user ID), and the type of content requested (e.g., item recommendations and/or creative content for a homepage, item recommendations and/or creative content for a category webpage, item recommendations and/or creative content for an anchor item webpage, etc.).

In response to receiving user first content request 401, unified platform computing device 102 may obtain user profile data 380 for the customer from database 116. Unified platform computing device 102 may generate label data based on the obtained user profile data 380 for the customer, and execute a trained machine learning model, such as one identified by machine learning models 392, to determine the content based on the type of content requested. For example, assuming user first content request 401 requests item recommendations, unified platform computing device 102 may determine a trained machine learning model to execute, may execute the trained machine learning model, and may generate user first item recommendations 403 identifying and characterizing the item recommendations for the customer. Web server 104 may then transmit user first item recommendations 403 to unified platform computing device 102.

Similarly, assuming user first content request 401 requests advertising recommendations, unified platform computing device 102 may determine a trained machine learning model to execute, may execute the trained machine learning model, and may generate user first ad recommendations 405 identifying and characterizing the advertisements for the customer. Web server 104 may then transmit first ad recommendations 405 to unified platform computing device 102. Likewise, assuming user first content request 401 requests creative content to display to the customer, unified platform computing device 102 may determine a trained machine learning model to execute, may execute the trained machine learning model, and may generate user first creative content recommendations 407 identifying and characterizing the advertisements for the customer. Web server 104 may then transmit user first creative content recommendations 407 to unified platform computing device 102. Web server 104 may display the content identified by user first item recommendations 403, user first ad recommendations 405, and user first creative content recommendations 407 to the customer.

Web server 105 may host another website that presents a second online marketplace. The customer may visit the second online marketplace, and web server 105 may generate and transmit to unified platform computing device 102 user second content request 411 requesting content for the customer. In response, unified platform computing device 102 may generate, based on the type of content requested as described above, one or more of user second item recommendations 413, user second ad recommendations 415, and user second creative content recommendations 417. Unified platform computing device 102 may transmit user second item recommendations 413, user second ad recommendations 415, and user second creative content recommendations 417 to unified platform computing device 102. Web server 105 may display the content identified by user second item recommendations 413, user second ad recommendations 415, and user second creative content recommendations 417 to the customer.

In some examples, a customer may visit the second online marketplace for a first time. In other examples, a customer may have visited and purchased items multiple times from the first online marketplace hosted by web server 104, but has less frequently (e.g., much less frequently) visited the second online marketplace hosted by web server 105. In these examples, user profile data 380 for the customer may be more heavily based on interactions the customer has had with the first online marketplace compared to interactions the customer has had with the second online marketplace. Nonetheless, because user profile data 380 is based on an aggregate of interactions with multiple tenants, including in this example at least the first online marketplace, unified platform computing device 102 may execute a trained machine learning model with the user profile data 380 for the customer to generate relevant content for the customer to view on the second online marketplace.

Figure 4B:
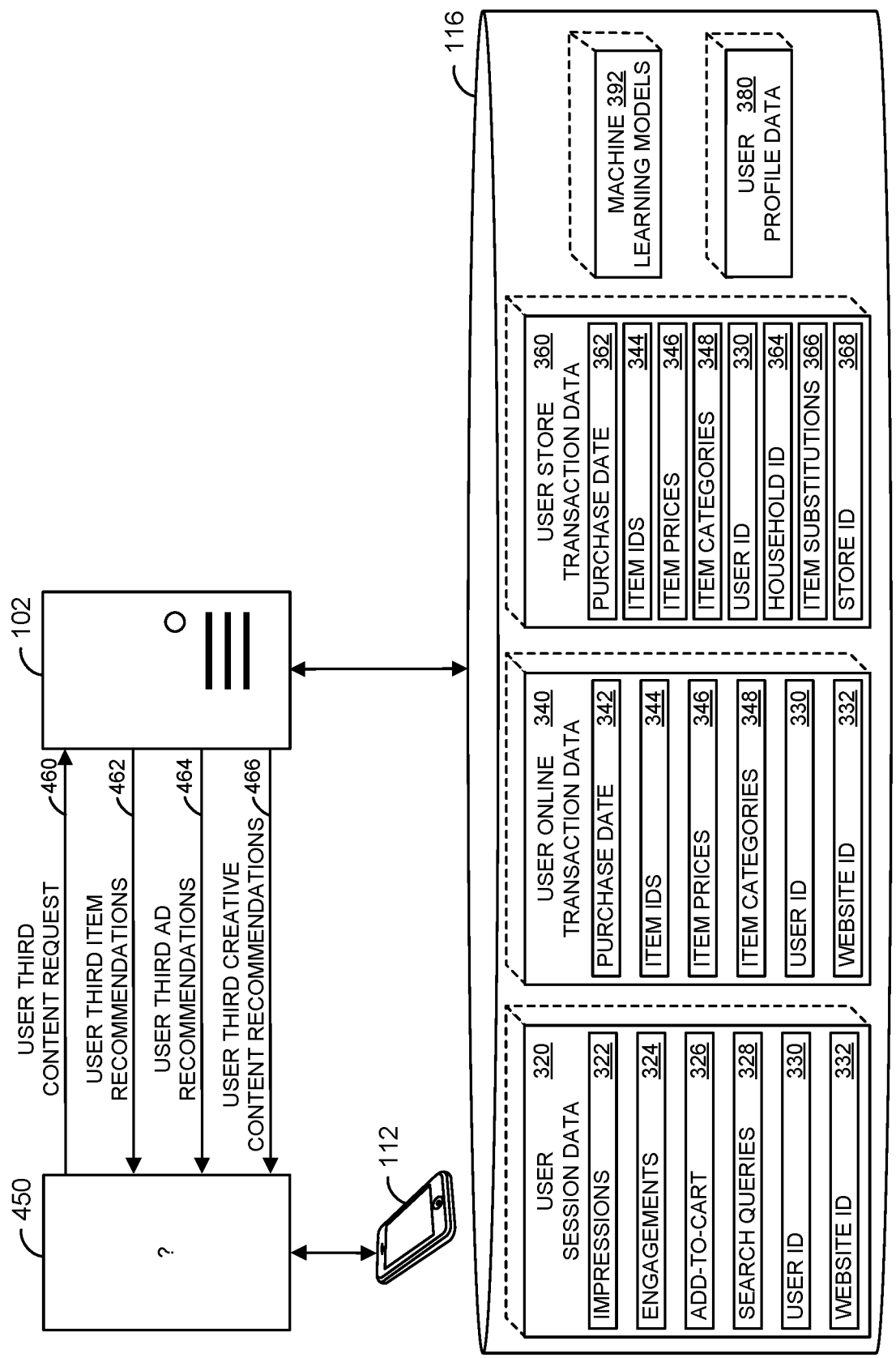

For example, FIG. 4B illustrates an example where a web server 450 hosts a website that a customer has never before visited. Web server 450 transmits to unified platform computing device 102 a user third content request 460 requesting content recommendations to display for the customer. In response, unified platform computing device 102 obtains user profile data 380 from database 116 for the customer. The user profile data 380 may be based solely on interactions the customer has had with the first online marketplace hosted by web server 104 and the second online marketplace hosted by web server 105. Unified platform computing device 102 may generate label data based on the obtained user profile data 380 for the customer, and generate one or more of item recommendations, advertisement recommendations, and creative content recommendations to be displayed to the customer. Unified platform computing device 102 may transmit to web server 450 user third item recommendations 462 identifying any item recommendations. Similarly, unified platform computing device 102 may transmit to web server 450 user third ad recommendations 464 identifying any advertisement recommendations, and user third create content recommendations 466 identifying any creative content recommendations.

Figure 5:
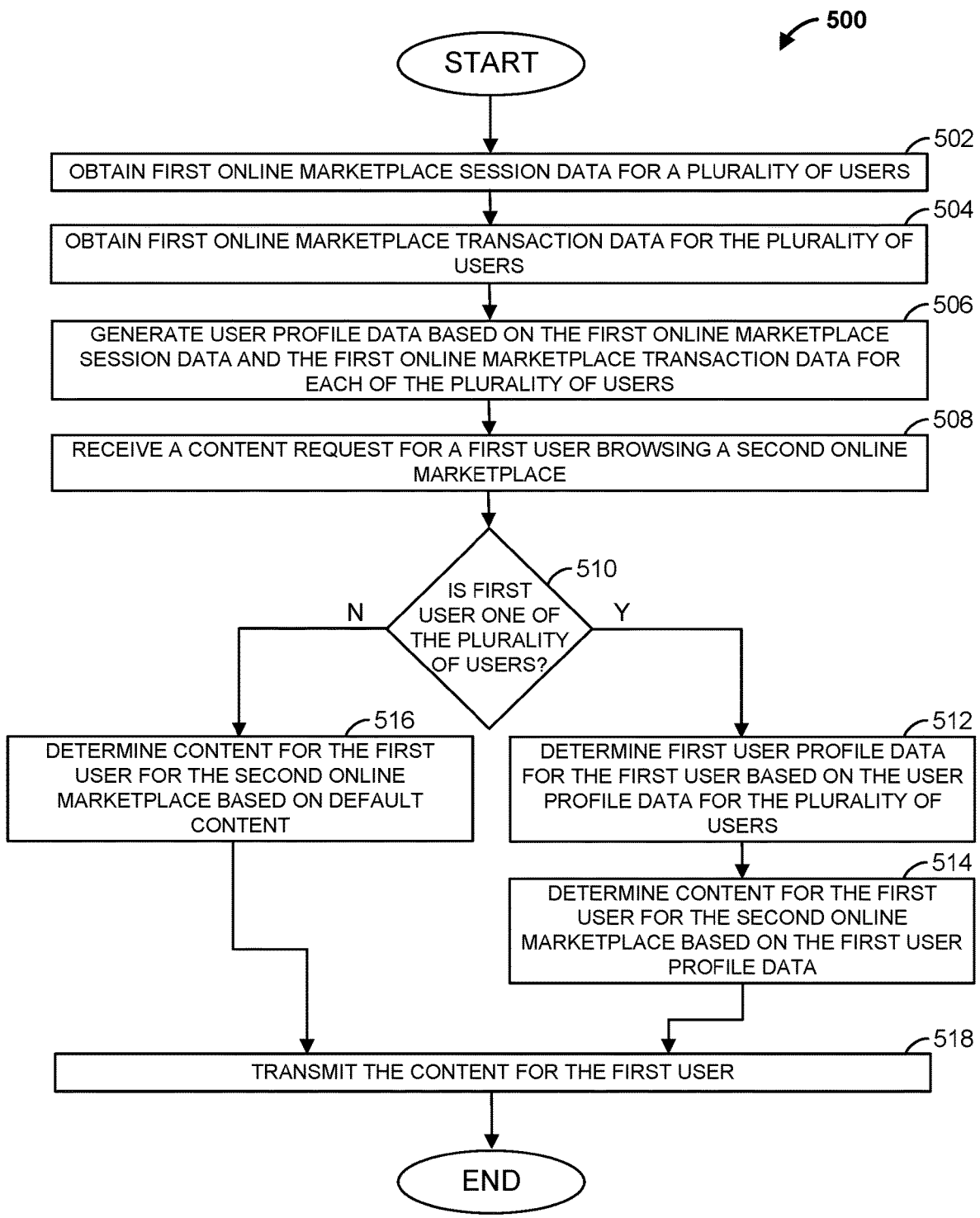
FIG. 5 is a flowchart of an example method that can be carried out by the unified platform computing device of FIG. 2 in accordance with some embodiments.

FIG. 5 is a flowchart of an example method 500 that can be carried out by the unified platform content recommendation system 100 of FIG. 1. Beginning at step 502, first online marketplace session data is obtained for a plurality of users. First online marketplace session data may identify and characterize browsing session events for a first online marketplace presented by a first website. For example, unified platform computing device 102 may receive first online session data 301 from web server 104 for each of a plurality of users. At step 604, first online marketplace transaction data for the plurality of users is obtained. First online marketplace transaction data may identify and characterize purchase transactions made by the plurality of users on the first online marketplace presented by the first website. For example, unified platform computing device 102 may receive first online transaction data 303 from web server 104 for each of the plurality of users.

Proceeding to step 506, user profile data for each of the plurality of users is generated. The user profile data is generated based on the first online marketplace session data and the first online marketplace transaction data associated with each of the plurality of users. For example, unified platform computing device 102 may generate user profile data 380 based on first online session data 301 and first online transaction data 303 for each of the plurality of users.

At step 508, a content request for a first user browsing a second online marketplace is received. For example, unified platform computing device 102 may receive user second content request 411 from web server 105 for a user browsing a second online marketplace. At step 510, a determination is made as to whether the first user is one of the plurality of users (i.e., a user with a user profile that was generated at step 506). If the first user is one of the plurality of users, the method proceeds to step 512, where first user profile data for the first user is determined based on the user profile data generated at step 506 for the plurality of users. For example, user profile data for a user ID that matches a user ID of the first user is identified from the generated user profile data.

The method then proceeds to step 514, where content for the first user is determined based on the first user profile data. For example, unified platform computing device 102 may execute a trained machine learning model with the first user profile data to generate item recommendations and/or create content recommendations for the first user.

Back at step 510, if the first user is not one of the plurality of users, the method proceeds to step 516, where content for the first user is determined based on default content. In other words, because the user has no user profile, unified platform computing device 102 may provide default content, such as default item recommendations and/or default creative content. In some examples, the default content is based on most popular items in a category, such as a category of an item the first user is browsing.

From steps 514 and 516 the method proceeds to step 518, where the content for the first user is transmitted. For example, unified platform computing device 102 may transmit the content for the first user to web server 105. Web server 105 may then display the content to the first user as the first user browses the second online marketplace. The method then ends.

Figure 6:
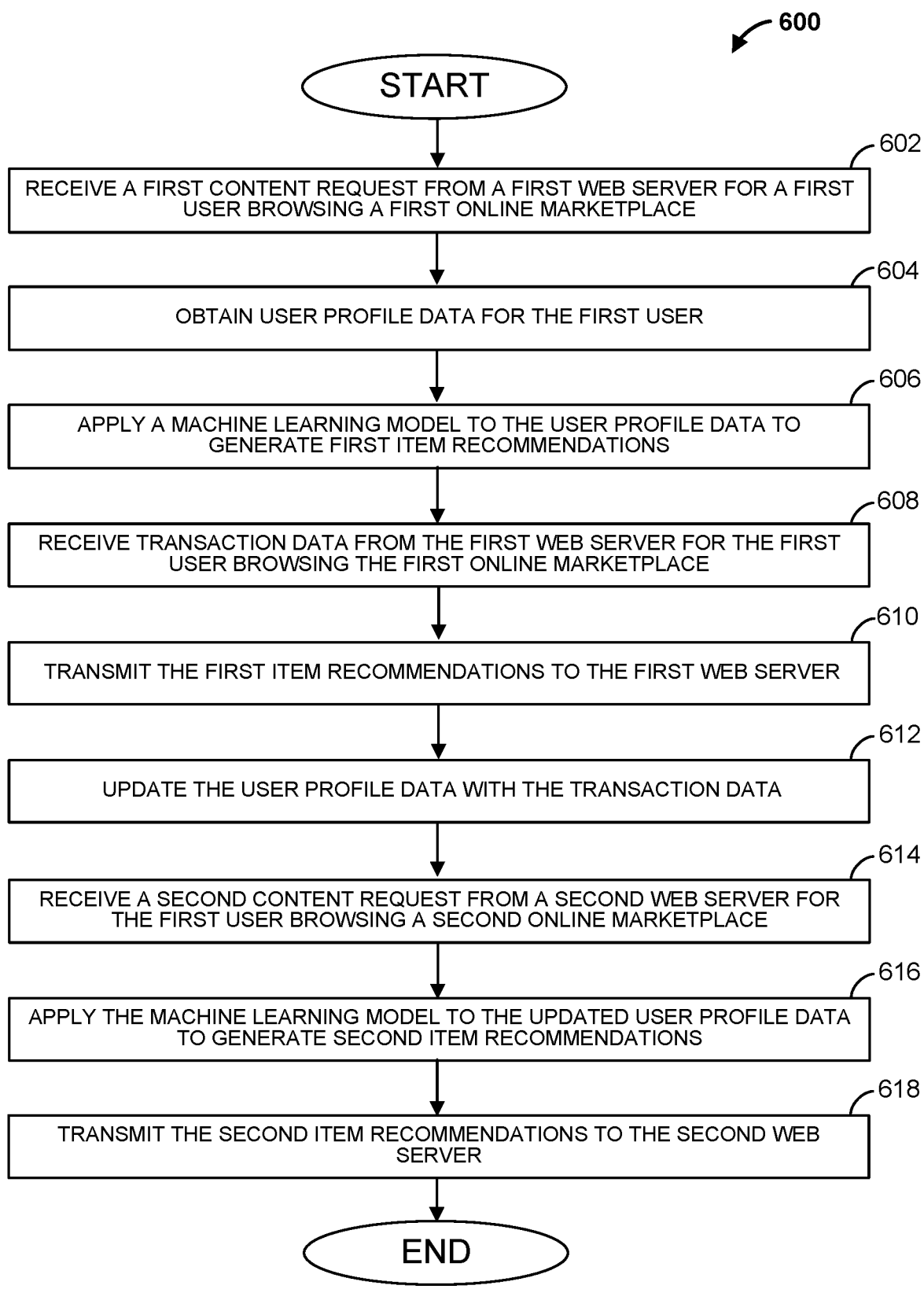
FIG. 6 is a flowchart of another example method that can be carried out by the unified platform computing device of FIG. 2 in accordance with some embodiments.

FIG. 6 is a flowchart of another example method 600 that can be carried out by the unified platform content recommendation system 100 of FIG. 1. Beginning at step 602, a first content request is received from a first web server for a first user browsing a first online marketplace. For example, unified platform computing device 102 may receive user first content request 401 from web server 104 for a user browsing a first online marketplace. At step 604, user profile data for the first user is obtained. For example, unified platform computing device 102 may determine user profile data for the user based on user profile data 380 stored in database 116. At step 606, a machine learning model is applied to the user profile data for the first user to generate first item recommendations. The machine learning model may be one identified and characterized by machine learning models 392 stored in database 116, for example. The first item recommendations are then transmitted to the first web server at step 608.

Proceeding to step 610, transaction data for the first user is received from the first web server. The transaction data identifies and characterizes one or more purchase transactions made by the first user on the first online marketplace presented by the first web server. At step 612, the user profile data for the first user is updated with the transaction data. For example, unified platform computing device 102 may update user profile data 380 stored in database 116 with the transaction data for the first user.

At step 614, a second content request is received from a second web server. The second content request is received for the first user browsing a second online marketplace. For example, unified platform computing device 102 may receive user second content request 411 from web server 105 for a user browsing a second online marketplace. At step 616, the machine learning model is applied to the updated user profile data to generate second item recommendations. The method then proceeds to step 618, where the second item recommendations are transmitted to the second web server. The second web server may display the second item recommendations to the first user. The method then ends.

Figure 7:
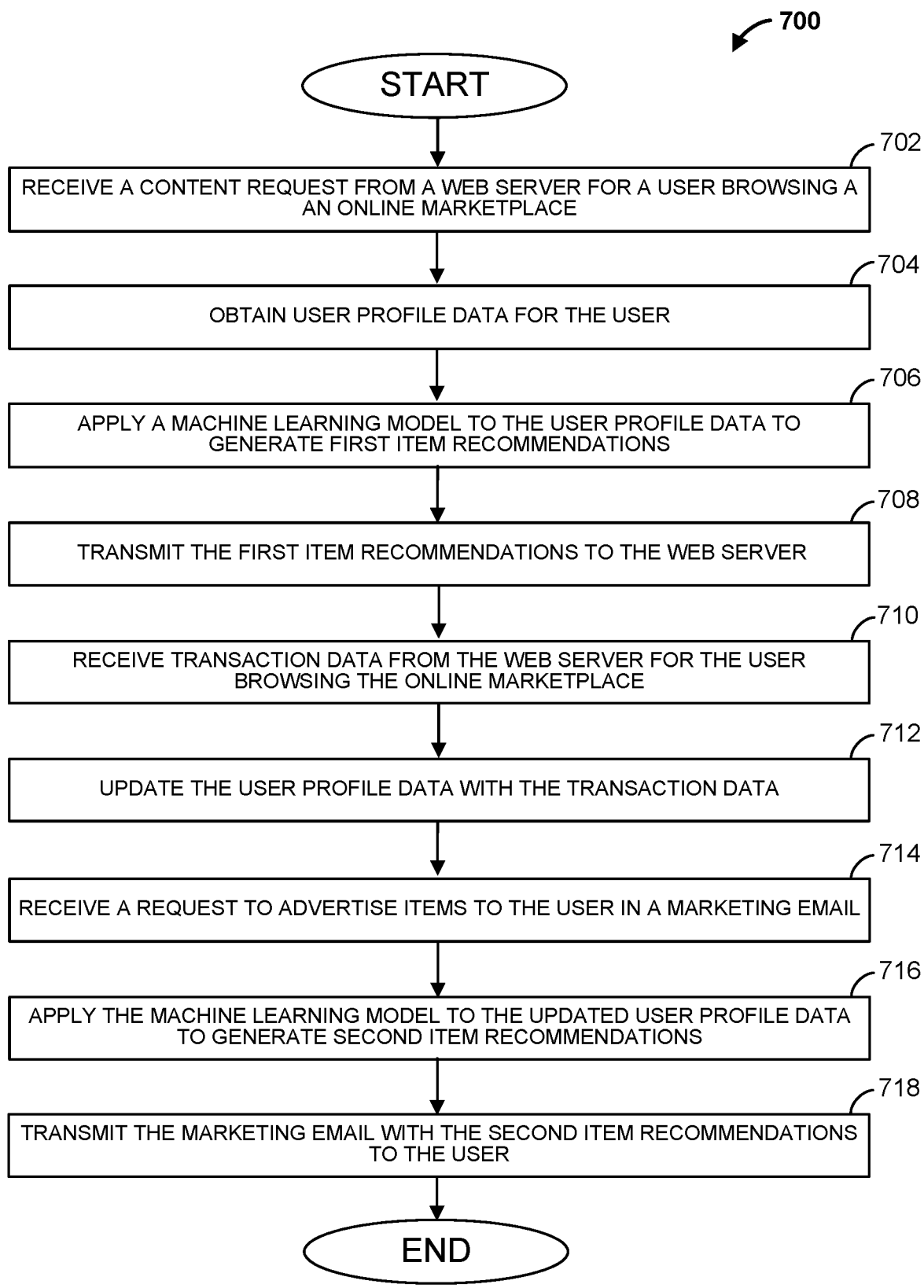
FIG. 7 is a flowchart of yet another example method that can be carried out by the unified platform computing device of FIG. 2 in accordance with some embodiments.

FIG. 7 is a flowchart of another example method 700 that can be carried out by the unified platform content recommendation system 100 of FIG. 1. Beginning at step 702, a content request is received from a web server for a user browsing an online marketplace. For example, unified platform computing device 102 may receive user first content request 401 from web server 104 for a user browsing a first online marketplace. At step 704, user profile data for the user is obtained. For example, unified platform computing device 102 may determine user profile data for the user based on user profile data 380 stored in database 116. At step 706, a machine learning model is applied to the user profile data for the user to generate first item recommendations. The machine learning model may be one identified and characterized by machine learning models 392 stored in database 116, for example. The first item recommendations are then transmitted to the web server at step 708.

Proceeding to step 710, transaction data for the user is received from the web server. The transaction data identifies and characterizes one or more purchase transactions made by the user on the online marketplace presented by the web server. At step 712, the user profile data for the user is updated with the transaction data. For example, unified platform computing device 102 may update user profile data 380 stored in database 116 with the transaction data for the first user.

At step 714, a request to advertise items to the user in a marketing email is received. At step 716, the machine learning model is applied to the updated user profile data to generate second item recommendations. At step 718, the marketing email with the second item recommendations is transmitted to the user. For example, unified platform computing device 102 may obtain an email address for the user from the user profile data, generate the marketing email directed to the user's email address, include the second item recommendations in the marketing email, and transmit the marketing email to the user's email address. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a memory device; and
   a computing device communicatively coupled to the memory device and configured to:
   obtain, from the memory device, session data identifying browsing events of a plurality of users for a first marketplace;
   obtain, from the memory device, transaction data identifying purchase transactions of at least a portion of the plurality of users for the first online marketplace;
   generate user profile data for each of the plurality of users based on the session data and the purchase transactions associated with the first marketplace;
   train a machine learning model with the user profile data for each of the plurality of users to determine content to display to the plurality of users;
   receive, from a different computing device, a content request for content to display to a first user on a second marketplace, the second marketplace different from the first marketplace wherein the first user is one of the plurality of users;
   obtain, from the memory device, at least a portion of at least one of session data and transaction data for the first user, wherein the at least one of the session data and the transaction data for the first user is associated with the first marketplace;
   generate a user profile for the first user based on the at least one of the session data and the transaction data for the first user associated with the first marketplace;
   determine content to display to the first user based on applying the trained machine learning model to at least a portion of the generated user profile for the first user, wherein determining the content to display to the first user further comprises:
      determining whether the generated user profile data for the plurality of users includes user profile data for the first user and determining default content to display to the first user based on the determination of whether the generated user profile data for the plurality of users includes user profile data for the first user;
   transmit the content to the different computing device for display on the second marketplace;
   receive from the different computing device, data from a real-time event;
   update the trained machine learning model based on the real-time event data;
   update content to display to the first user based on the updated trained machine learning model;
   transmit the updated content;
   determine a conversion rate based on the content; and
   determine the trained machine learning model is trained when the conversion rate is beyond a threshold value.

2. The system of claim 1, wherein the trained machine learning model is trained with historical session data and historical transaction data for the first online marketplace.

3. The system of claim 1, wherein the computing device is configured to apply the trained machine learning model across a plurality of tenants.

4. The system of claim 1, wherein the content to display comprises creative content to display to the first user.

5. The system of claim 1, wherein determining the content to display to the first user based on the generated user profile data for the plurality of users comprises:
- identifying first user profile data for the first user from the user profile data; and
- determining the content to display based on the first user profile data.

6. The system of claim 5, the computing device is configured to receive transaction data identifying purchases by the first user in a first store, and update the first user profile data with the transaction data.

7. The system of claim 1, wherein the computing device is configured to:
- receive a request to transmit a communication to the first user with item advertisements;
- determine first user profile data for the first user based on the generated user profile data for the plurality of users;
- determine item advertisements based on applying a machine learning model to the first user profile data;
- generate the communication to the first user with the item advertisements; and
- transmit the communication to the first user.

8. A method by a computing device comprising:
- obtaining, from a memory device, session data identifying browsing events of a plurality of users for a first marketplace;
- obtaining, from the memory device, transaction data identifying purchase transactions of at least a portion of the plurality of users for the first online marketplace;
- generating user profile data for each of the plurality of users based on the session data and the purchase transactions associated with the first marketplace;
- training a machine learning model with the user profile data for each of the plurality of users to determine content to display to the plurality of users;
- receiving, from a different computing device, a content request for content to display to a first user on a second marketplace, the second marketplace different from the first marketplace, wherein the first user is one of the plurality of users;
- obtaining, from the memory device, at least a portion of at least one of session data and transaction data for the first user, wherein the at least one of the session data and the transaction data for the first user is associated with the first marketplace;
- generating a user profile for the first user based on the at least one of the session data and the transaction data for the first user associated with the first marketplace;
- determining content to display to the first user based on applying the trained machine learning model to at least a portion of the generated user profile for the first user, wherein determining the content to display to the first user comprises:
  - determining whether the generated user profile data for the plurality of users includes user profile data for the first user and determining default content to display to the first user based on the determination of whether the generated user profile data for the plurality of users includes user profile data for the first user;
- transmitting the content to the different computing device for display on the second marketplace;
- determining a conversion rate based on the content; and
- determining the trained machine learning model is trained when the conversion rate is beyond a threshold value.

9. The method of claim 8, comprising applying the trained machine learning model across a plurality of tenants.

10. The method of claim 8, wherein determining the content to display to the first user based on the generated user profile data for the plurality of users comprises:
- identifying first user profile data for the first user from the user profile data; and
- determining the content to display based on the first user profile data.

11. The method of claim 8, comprising:
- receiving a request to transmit a communication to the first user with item advertisements;
- determining first user profile data for the first user based on the generated user profile data for the plurality of users;
- determining item advertisements based on applying a machine learning model to the first user profile data;
- generating the communication to the first user with the item advertisements; and
- transmitting the communication to the first user.

12. The method of claim 8, wherein determining the default content for the first user is based on one or more items in a category of an item the first user is browsing.

13. A non-transitory computer readable medium having instructions stored thereon, wherein the instructions, when executed by at least one processor, cause a device to perform operations comprising:
- obtaining, from a memory device, session data identifying browsing events of a plurality of users for a first marketplace;
- obtaining, from the memory device, transaction data identifying purchase transactions of at least a portion of the plurality of users for the first online marketplace;
- generating user profile data for each of the plurality of users based on the session data and the purchase transactions associated with the first marketplace;
- training a machine learning model with the user profile data for each of the plurality of users to determine content to display to the plurality of users;
- receiving, from a different computing device, a content request for content to display to a first user on a second marketplace, the second marketplace different from the first marketplace, wherein the first user is one of the plurality of users;
- obtaining, from the memory device, at least a portion of at least one of session data and transaction data for the first user, wherein the at least one of the session data and the transaction data for the first user is associated with the first marketplace;
- generating a user profile for the first user based on the at least one of the session data and the transaction data for the first user associated with the first marketplace;
- determining content to display to the first user based on applying the trained machine learning model to at least a portion of the generated user profile for the first user, wherein determining the content to display to the first user comprises:
  - determining whether the generated user profile data for the plurality of users includes user profile data for the first user and determining default content to display to the first user based on the determination of whether the generated user profile data for the plurality of users includes user profile data for the first user;
- transmitting to the different computing device the content for display on the second marketplace;
- determining a conversion rate based on the content; and
- determining the trained machine learning model is trained when the conversion rate is beyond a threshold value.

14. The non-transitory computer readable medium of claim 13, having additional instructions stored thereon, wherein the additional instructions, when executed by the at least one processor, cause the device to perform additional operations comprising applying the trained machine learning model across a plurality of tenants.

15. The non-transitory computer readable medium of claim 13, having additional instructions stored thereon, wherein the additional instructions, when executed by the at least one processor, cause the device to perform additional operations comprising:
   identifying first user profile data for the first user from the user profile data; and
   determining the content to display based on the first user profile data.

16. The non-transitory computer readable medium of claim 13, having additional instructions stored thereon, wherein the additional instructions, when executed by the at least one processor, cause the device to perform additional operations comprising:
   receiving a request to transmit a communication to the first user with item advertisements;
   determining first user profile data for the first user based on the generated user profile data for the plurality of users;
   determining item advertisements based on applying a machine learning model to the first user profile data;
   generating the communication to the first user with the item advertisements; and transmitting the communication to the first user.

* * * * *